(12) United States Patent
Shibata

(10) Patent No.: US 7,343,610 B2
(45) Date of Patent: Mar. 11, 2008

(54) CHUCKING MECHANISM FOR DISC RECORDING MEDIUM AND DISC DRIVE WITH SUCH CHUCKING MECHANISM

(75) Inventor: Keiichi Shibata, Tokyo (JP)

(73) Assignee: Sony Corporation (JP)

( * ) Notice: Subject to any disclaimer, the term of this patent is extended or adjusted under 35 U.S.C. 154(b) by 425 days.

(21) Appl. No.: 10/948,274

(22) Filed: Sep. 23, 2004

(65) Prior Publication Data
US 2005/0081229 A1    Apr. 14, 2005

(30) Foreign Application Priority Data
Oct. 8, 2003    (JP) ............................. P2003-349451

(51) Int. Cl.
G11B 17/03    (2006.01)
G11B 17/028    (2006.01)
G11B 19/20    (2006.01)

(52) U.S. Cl. ...................... 720/713; 720/714; 720/706; 720/712; 720/707

(58) Field of Classification Search ................ 720/709, 720/707, 713, 712, 706; 279/33, 35, 106, 279/109
See application file for complete search history.

(56) References Cited

U.S. PATENT DOCUMENTS 5,633,856 A * 5/1997 Mukawa ..................... 720/712
6,038,206 A * 3/2000 Mukawa ..................... 720/707
6,363,048 B1 * 3/2002 Wu et al. .................... 720/707
6,611,490 B1 * 8/2003 Bierhoff ..................... 720/707
2002/0031077 A1 * 3/2002 Shiwa ........................ 369/271
2002/0089918 A1 * 7/2002 Watanabe et al. ........... 369/270

FOREIGN PATENT DOCUMENTS

JP       10124967 A  *  5/1998
JP    2001101738 A  *  4/2001

* cited by examiner

Primary Examiner—Andrea Wellington
Assistant Examiner—Adam B Dravininkas
(74) Attorney, Agent, or Firm—Lerner, David, Littenberg, Krumholz & Mentlik, LLP

(57) ABSTRACT

A low-profile chucking mechanism holds a disc recording medium on a turntable that has a plurality of first engaging teeth and a plurality of second engaging teeth. When the disc recording medium is to be mounted on a disc supporting surface of the turntable, the first engaging teeth are pushed radially inwardly of the rotational axis of the turntable by the edge of a central circular hole of the disc recording medium. When the first engaging teeth are moved, the second engaging teeth are biased in ganged relation to the first engaging teeth radially outwardly of the rotational axis of the turntable and engage the edge of the central circular hole of the disc recording medium mounted on the disc supporting surface, thereby pressing and holding the disc recording medium against the disc supporting surface.

4 Claims, 7 Drawing Sheets

F I G. 1
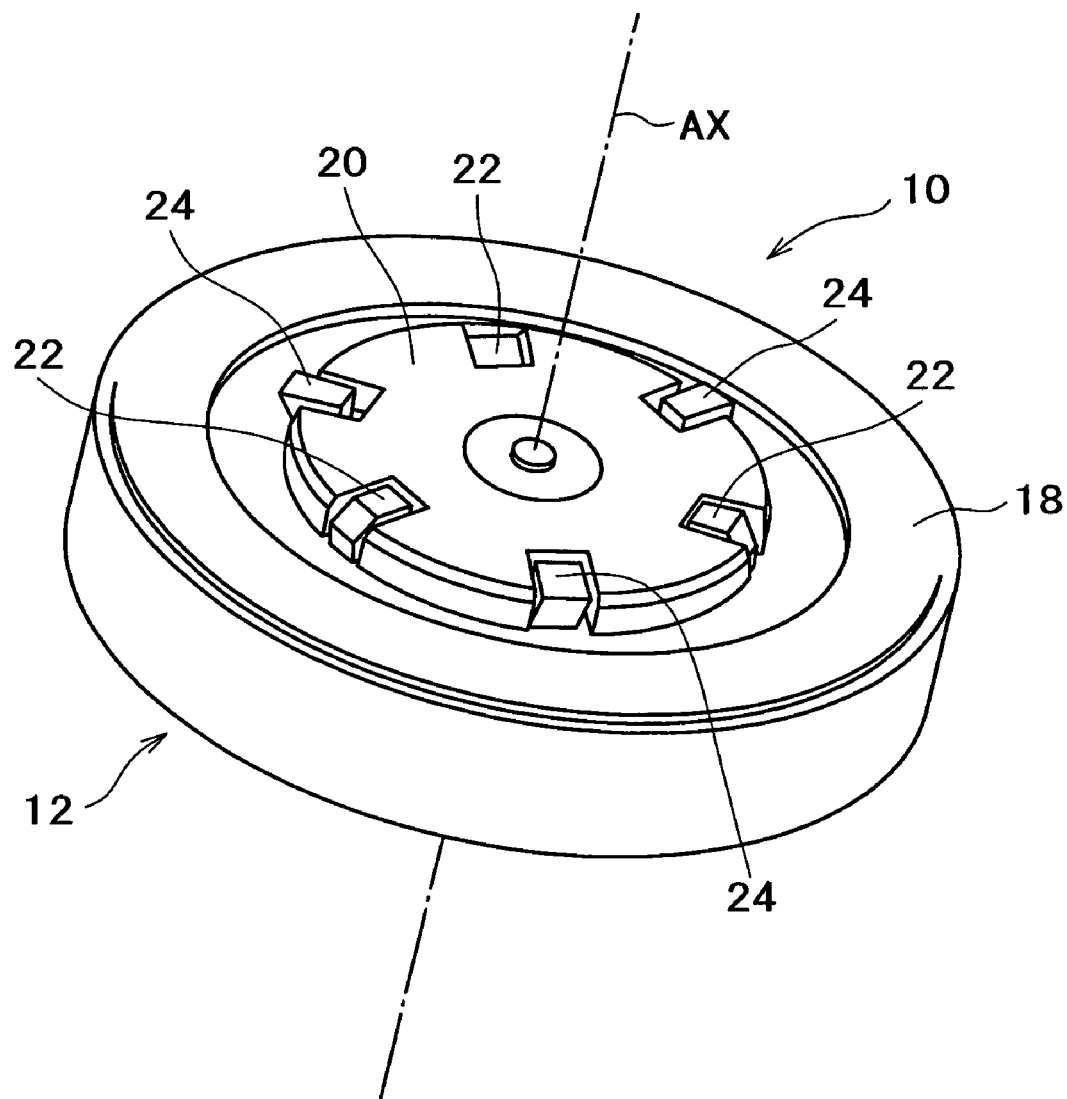

F I G. 4
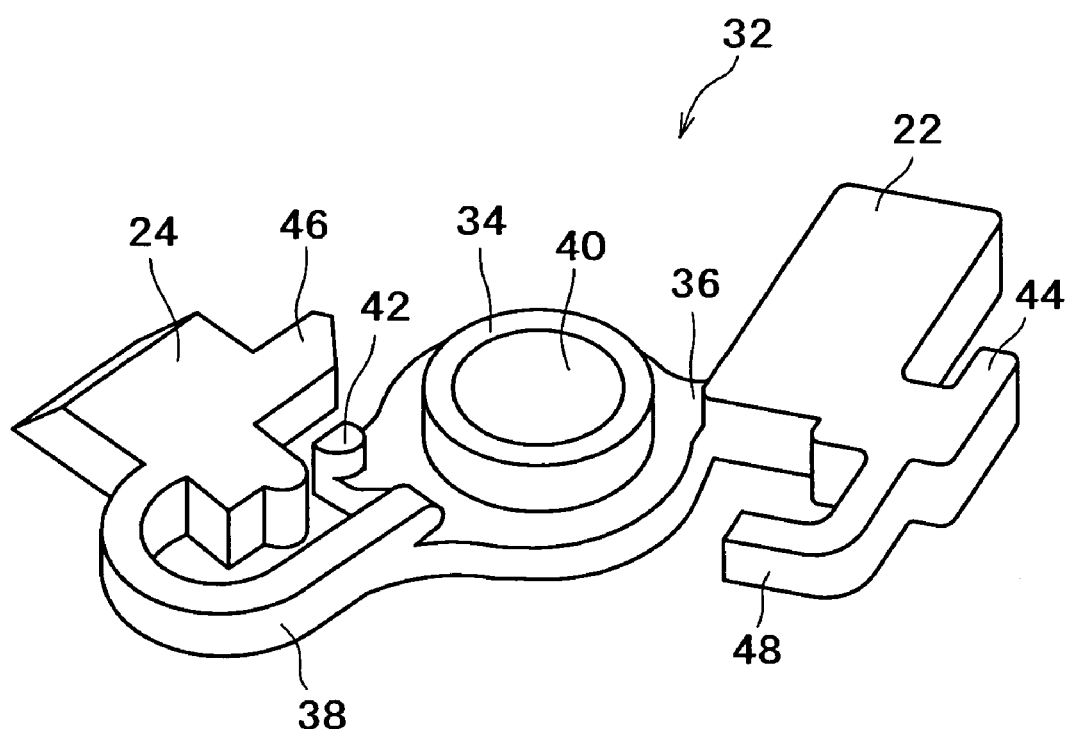

CHUCKING MECHANISM FOR DISC RECORDING MEDIUM AND DISC DRIVE WITH SUCH CHUCKING MECHANISM

BACKGROUND OF THE INVENTION

The present invention relates to a chucking mechanism for holding a disc recording medium having a central circular hole, such as a compact disc (CD) or a digital versatile disc (DVD), on the disc supporting surface of the turntable of a disc drive, and a disc drive incorporating such a chucking mechanism.

CDs and DVDs are removable disc recording mediums for use on the turntable of a disc drive, and have central circular holes for mounting themselves in the disc drive. The disc drive has a turntable having a disc supporting surface and a holding mechanism for holding a loaded disc recording medium on the disc supporting surface.

Of disc drives compatible with CDs and DVDs, portable CD players and DVD players and disc drives for use in notebook personal computers are required to be of a low profile. Many efforts are made to reduce the thickness of those disc drives even by a fraction of 1 mm. Primary factors responsible for determining the thickness of disc drives are the thickness of a drive motor for rotating a disc recording medium and the thickness of a holding mechanism for holding a disc recording medium on the turntable.

Various types of holding mechanisms are available in the art. The holding mechanism of the type which is most desirable from the standpoint of a low-profile design includes a chucking mechanism combined with a turntable and having movable teeth for pressing and holding a disc recording medium against the disc supporting surface of the turntable. FIGS. 6 to 8 of the accompanying drawings show a conventional chucking mechanism of the above type.

As shown in FIG. 6, a turntable 62 is connected to the output shaft of a flat disc-shaped spindle motor 60. A central block 64 for fitting in a central circular hole defined in a disc recording medium such as a CD or the like is disposed centrally on the upper surface of the turntable 62. The central block 64 is shaped as a flat disc-shaped cap-like member, and is fixed to the turntable 62 concentrically with the rotational axis of the turntable 62. The central block 64 has an outside diameter which matches the inner diameter of a central circular hole 14 (see FIG. 8) of a disc recording medium 16. The disc recording medium 16 to be mounted is positioned in alignment with the rotational axis of the turntable 62 by the central block 64. The turntable 62 has three engaging teeth 66 which are movable substantially radially into and out of the outer circumferential surface of the central block 64.

FIG. 7 shows in perspective the reverse side of the central block 64 illustrated in FIG. 6, illustrating internal components in the central block 64. The central block 64 has three sliders 68 supported thereon for radial sliding movement and normally urged to move radially outwardly by respective helical springs 70. The engaging teeth 66 are mounted on the respective radially outer ends of the sliders 68. When the sliders 68 slide radially, the engaging teeth 66 move radially into and out of the outer circumferential surface of the central block 64.

FIG. 8 shows at an enlarged scale each of the engaging teeth 66 illustrated in FIGS. 6 and 7. As shown in FIG. 8, the engaging tooth 66 has on its distal end a first engaging surface 72 facing obliquely upwardly and a second engaging surface 74 facing obliquely downwardly. For mounting the disc recording medium 16 on the turntable 62, the user holds the disc recording medium 16 by hand, and presses the disc recording medium 16 against the turntable 62 so that the central block 64 of the turntable 62 fits in the central circular hole 14 of the disc recording medium 16. The edge of the central circular hole 14 at the lower surface of the disc recording medium 16 engages and presses the first engaging surfaces 72 of the engaging teeth 66 downwardly. Therefore, when the user presses the disc recording medium 16 downwardly, the engaging teeth 66 are forced radially inwardly against the bias of the helical springs 70.

As the user continuously presses the disc recording medium 16 downwardly until the lower surface of the disc recording medium 16 abuts against the upper surface of the turntable 62, the pointed edges of the distal ends of the engaging teeth 66 are displaced upwardly from the central circular hole 14 of the disc recording medium 16. The second engaging surfaces 74 of the engaging teeth 66 are now brought into engagement with the edge of the central circular hole 14 at the upper surface of the disc recording medium 16, whereupon the engaging teeth 66 hold the disc recording medium 16 on the turntable 62. The position of the parts at this time is illustrated in FIG. 8. As can be seen from FIG. 8, the thickness of the engaging teeth 66 is about three times the thickness of the disc recording medium 16 that is mounted. The thickness of the engaging teeth 66 is large because the first engaging surface 72 and the second engaging surface 74 are vertically juxtaposed. Therefore, the thickness of the conventional chucking mechanism cannot be made smaller than the thickness of the engaging teeth 66.

Another conventional chucking mechanism is disclosed in Japanese Patent Laid-Open No. 2000-182305, for example. However, the disclosed conventional chucking mechanism has a thickness greater than the above-mentioned conventional chucking mechanism.

The conventional chucking mechanism described above with reference to FIGS. 6 to 8 appears to be of a lowest profile among the conventional mechanisms for holding a removable disc recording medium on the disc supporting surface of a turntable. Nevertheless, the thickness of the conventional chucking mechanism needs to be about three times the thickness of the disc recording medium. Many devices which incorporate disc drives for playing back removable disc recording mediums, e.g., portable CD players and DVD players and disc drives for use in notebook personal computers, have their commercial values increased directly by a reduction of their thickness even by 1 mm. In view of this trend, there is apparently a strong demand for lower-profile chucking mechanisms.

SUMMARY OF THE INVENTION

It is therefore an object of the present invention to provide an improved chucking mechanism of a lower profile for holding a disc recording medium having a central circular hole on the disc supporting surface of a turntable. Another object of the present invention is to provide a disc drive which incorporates such a chucking mechanism.

According to the first aspect of the present invention, there is provided a chucking mechanism including:

a disc recording medium support for placing a disc recording medium having a central circular hole thereon;

a central block projecting along a rotational axis of the disc recording medium concentrically with a rotational axis of the disc recording medium support, for fitting in the central circular hole of the disc recording medium;

a first engaging tooth mounted on the central block for projecting radially of the rotational axis of the disc recording medium, the first engaging tooth being movable into the central block by engagement with an edge of the central circular hole of the disc recording medium when the disc recording medium is placed on the disc recording medium support; and a second engaging tooth mounted on the central block at a position different from a position of the first engaging tooth, for projecting radially of the rotational axis of the disc recording medium to urge the disc recording medium against the disc recording medium support.

According to the second aspect of the present invention, there is provided a chucking mechanism for holding a disc recording medium having a central circular hole on a disc supporting surface of a turntable, including:

a plurality of first engaging teeth mounted on the turntable for movement substantially radially of a rotational axis of the turntable, the first engaging teeth being movable by engagement of an edge of the central circular hole of the disc recording medium when the disc recording medium is placed on the disc supporting surface of the turntable; and a plurality of second engaging teeth mounted on the turntable for movement substantially radially of the rotational axis of the turntable, the second engaging teeth being movable radially outwardly of the rotational axis of the turntable in ganged relation to the movement of the first engaging teeth for pressing and holding the disc recording medium against the disc supporting surface of the turntable by engagement with an edge of the central circular hole of the disc recording medium when the disc recording medium is placed on the disc recording medium support.

According to the third aspect of the present invention, there is provided a chucking mechanism for holding a disc recording medium having a central circular hole on a disc supporting surface of a turntable, including:

a plurality of first engaging teeth mounted on the turntable for movement substantially radially of a rotational axis of the turntable, the first engaging teeth having radially outer ends engageable with an edge of the central circular hole of the disc recording medium, the first engaging teeth being urged radially outwardly of the rotational axis of the turntable; and a plurality of second engaging teeth mounted on the turntable for movement substantially radially of the rotational axis of the turntable, the second engaging teeth having radially outer ends engageable with the edge of the central circular hole of the disc recording medium, the second engaging teeth being movable radially outwardly of the rotational axis of the turntable in ganged relation to the movement of the first engaging teeth when the first engaging teeth are pushed radially inwardly of the rotational axis of the turntable;

the first engaging teeth having on the radially outer ends thereof engaging surfaces for engaging the edge of the central circular hole of the disc recording medium when the disc recording medium is to be mounted on the disc supporting surface, for thereby producing forces to push the first engaging teeth radially inwardly;

the second engaging teeth having on the radially outer ends thereof engaging surfaces for engaging the edge of the central circular hole of the disc recording medium which has been mounted on the disc supporting surface, for thereby producing forces to press and hold the disc recording medium against the disc supporting surface of the turntable;

wherein, when the disc recording medium is to be mounted on the disc supporting surface, the first engaging teeth are pushed radially inwardly of the rotational axis of the turntable by the edge of the central circular hole of the disc recording medium, and when the disc recording medium has been mounted on the disc supporting surface, the second engaging teeth hold the disc recording medium on the disc supporting surface of the turntable.

According to the fourth aspect of the present invention, there is provided a chucking mechanism for holding a disc recording medium having a central circular hole on a disc supporting surface of a turntable, including:

a plurality of first engaging teeth mounted on the turntable for movement substantially radially of a rotational axis of the turntable, the first engaging teeth having radially outer ends engageable with an edge of the central circular hole of the disc recording medium;

a plurality of second engaging teeth mounted on the turntable for movement substantially radially of the rotational axis of the turntable, the second engaging teeth having radially outer ends engageable with the edge of the central circular hole of the disc recording medium;

the first engaging teeth having on the radially outer ends thereof engaging surfaces for engaging the edge of the central circular hole of the disc recording medium when the disc recording medium is to be mounted on the disc supporting surface, for thereby producing forces to push the first engaging teeth radially inwardly;

the second engaging teeth having on the radially outer ends thereof engaging surfaces for engaging the edge of the central circular hole of the disc recording medium which has been mounted on the disc supporting surface, for thereby producing forces to press and hold the disc recording medium against the disc supporting surface of the turntable; and a biasing mechanism for biasing the first engaging teeth radially outwardly of the rotational axis of the turntable; and a ganged biasing mechanism for keeping the first engaging teeth and the second engaging teeth in ganged relation and biasing the second engaging teeth radially outwardly of the rotational axis of the turntable when the first engaging teeth are pushed radially inwardly of the rotational axis of the turntable;

wherein, when the disc recording medium is to be mounted on the disc supporting surface, the first engaging teeth are pushed radially inwardly of the rotational axis of the turntable by the edge of the central circular hole of the disc recording medium, and when the disc recording medium has been mounted on the disc supporting surface, the second engaging teeth hold the disc recording medium on the disc supporting surface of the turntable.

According to the fifth aspect of the present invention, there is provided a chucking mechanism for holding a disc recording medium having a central circular hole on a disc supporting surface of a turntable, including:

a central block disposed centrally on the turntable concentrically with a rotational axis of the turntable, for fitting in the central circular hole of the disc recording medium; and a plurality of swing members swingably supported on the central block and disposed in positions equally spaced from the rotational axis of the turntable at angularly spaced intervals in a circumferential direction of the turntable;

each of the swing members including a central pivot support, a first engaging tooth joined to the central pivot support by a first arm, and a second engaging tooth joined to the central pivot support by a second arm, the swing member being supported at the central pivot support for swinging movement about a swing axis parallel to the rotational axis of the turntable, the first and second engaging teeth being located in opposite positions spaced across the central pivot support in the circumferential direction around the rotational axis of the turntable;

at least one of the first and second arms of the swing members being flexible to allow the first engaging tooth to move substantially radially of the rotational axis of the turntable when the swing member swings or the first arm flexes, and also to allow the second engaging tooth to move substantially radially of the rotational axis of the turntable when the swing member swings or the second arm flexes;

each of the swing members further including a biasing mechanism for biasing the first engaging tooth radially outwardly of the rotational axis of the turntable by biasing the swing member in one swinging direction, so that the biasing mechanism keeps the first and second engaging teeth in ganged relation and biases the second engaging tooth radially outwardly of the rotational axis of the turntable when the first engaging tooth is pushed radially inwardly of the rotational axis of the turntable;

the first engaging tooth having a radially outer end capable of projecting radially outwardly from an outer circumferential surface of the central block and engageable with an edge of the central circular hole of the disc recording medium, the first engaging tooth having on the radially outer end an engaging surface for engaging the edge of the central circular hole of the disc recording medium when the disc recording medium is to be mounted on the disc supporting surface, for thereby producing forces to push the first engaging teeth radially inwardly;

the second engaging tooth having a radially outer end capable of projecting radially outwardly from the outer circumferential surface of the central block and engageable with an edge of the central circular hole of the disc recording medium, the second engaging tooth having on the radially outer end an engaging surface for engaging the edge of the central circular hole of the disc recording medium which has been mounted on the disc supporting surface, for thereby producing forces to press and hold the disc recording medium against the disc supporting surface of the turntable;

wherein, when the disc recording medium is to be mounted on the disc supporting surface, the first engaging tooth is pushed radially inwardly of the rotational axis of the turntable by the edge of the central circular hole of the disc recording medium, and when the disc recording medium has been mounted on the disc supporting surface, the second engaging tooth holds the disc recording medium on the disc supporting surface of the turntable.

According to the sixth aspect of the present invention, there is provided a disc drive including a chucking mechanism including:

a disc recording medium support for placing a disc recording medium having a central circular hole thereon;

a central block projecting along a rotational axis of the disc recording medium concentrically with a rotational axis of the disc recording medium support, for fitting in the central circular hole of the disc recording medium;

a first engaging tooth mounted on the central block for projecting radially of the rotational axis of the disc recording medium, the first engaging tooth being movable into the central block by engagement with an edge of the central circular hole of the disc recording medium when the disc recording medium is placed on the disc recording medium support; and a second engaging tooth mounted on the central block at a position different from a position of the first engaging tooth, for projecting radially of the rotational axis of the disc recording medium to urge the disc recording medium against the disc recording medium support.

With the arrangement of the present invention, the chucking mechanism for holding a disc recording medium having a central circular hole on the disc supporting surface of a turntable can be constructed in a very low profile, and the disc drive incorporating the chucking mechanism can also be constructed in a very low profile.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 1 is a perspective view of a turntable having a chucking mechanism for holding a disc recording medium having a central circular hole on the disc supporting surface of a turntable, according to an embodiment of the present invention;

FIG. 4 is a perspective view of a swing member removed from the central block shown in FIG. 3;

DETAILED DESCRIPTION OF THE PREFERRED EMBODIMENT

Figure 2A:
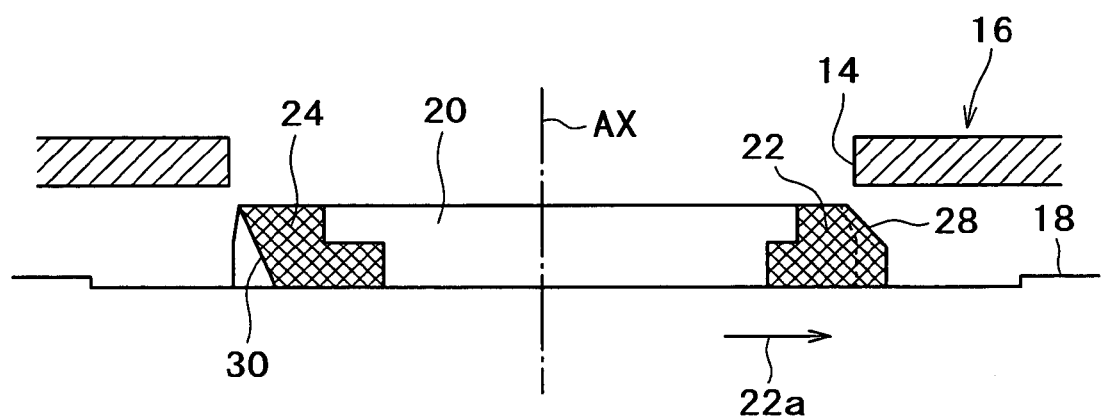
FIG. 2A is a cross-sectional view of a central block, a first engaging tooth, and a second engaging tooth shown in FIG. 1, together with a disc recording medium. The disc recording medium is shown in a state prior to being mounted on a turntable.

FIG. 1 shows in perspective a turntable 12 having a chucking mechanism 10 for holding a disc recording medium having a central circular hole on the disc supporting surface of a turntable, according to an embodiment of the present invention. The chucking mechanism 10 and the turntable 12 are used in a disc drive for playing back a compact disc. The chucking mechanism according to the present invention is not limited to use in a disc drive for CDs, but may be used in disc drives for any disc recording mediums insofar as the disc recording mediums have a central circular hole and can be held on the disc supporting surface of a turntable by engaging teeth that engage the edge of the central circular hole. Those disc recording mediums include digital versatile discs, for example.

As shown in FIG. 1, the chucking mechanism 10 is disposed on the turntable 12 of the disc drive. The disc drive has a flat disc-shaped spindle motor (not shown) for rotating the turntable 12. The turntable 12 is connected to the output shaft of the spindle motor so as to be drivable thereby. The spindle motor is housed substantially in its entirety within the turntable 12. The spindle motor and the turntable 12 jointly make up a unit that is incorporated in the disc drive.

In FIG. 1, the turntable 12 has a rotational axis indicated by alternate long and short dash lines AX. In the description that follows, directions will be referred to with respect to the rotational axis AX of the turntable 12 unless otherwise noted. For example, a "radial direction" means a direction which extends with respect to the rotational axis AX. The turntable 12 may actually be oriented in directions other than the direction shown in FIG. 1. For illustrative purposes, however, upward and downward directions in FIG. 1 will be referred to as upward and downward directions with respect to the turntable 12. Consequently, FIG. 1 shows the turntable 12 in perspective as seen obliquely from above the turntable 12. Upward and downward directions of other components will also similarly be referred to.

The turntable 12 has a circular disc supporting surface 18 on the peripheral edge portion of its upper surface. The disc supporting surface 18 abuts against a peripheral area around a central circular hole 14 of the lower surface of a disc recording medium 16 (see FIGS. 2A to 4) for thereby supporting the disc recording medium 16 thereon.

A central block 20 for fitting in the central circular hole defined in the disc recording medium 16 is disposed centrally on the upper surface of the turntable 12. The central block 20 is shaped as a flat disc-shaped cap-like member, and is fixed to the turntable 12 concentrically with the rotational axis AX of the turntable 12. The central block 20 has an outside diameter which matches the inner diameter of the central circular hole 14 of the disc recording medium 16. The disc recording medium 16 to be mounted is positioned in alignment with the rotational axis AX of the turntable 12 by the central block 20. The central block 20 has a thickness which is substantially equal to and slightly greater than the thickness of the disc recording medium 16 to be mounted thereon (see FIGS. 2A to 4).

The turntable 12 has three first engaging teeth 22 and three second engaging teeth 24 which are movable substantially radially into and out of the outer circumferential surface of the central block 20. The first and second engaging teeth 22, 24 are alternately positioned at substantially equal, angularly spaced intervals of 60° on the peripheral edge of the central block 20.

The first and second engaging teeth 22, 24 have respective distal ends (radially outer ends) that can project radially outwardly from the outer circumferential surface of the central block 20 for engagement with the edge of the central circular hole 14 of the disc recording medium 16. When the disc recording medium 16 is not mounted on the turntable 12, the first engaging teeth 22 are biased radially outwardly to project a certain distance from the outer circumferential surface of the central block 20. Meanwhile, the second engaging teeth 24 remain positioned radially inwardly of the outer circumferential surface of the central block 20. When the user attempts to put the disc recording medium 16 on the disc supporting surface 18 of the turntable 12, the first engaging teeth 22 are engaged and moved by the edge of the central circular hole 14 of the disc recording medium 16. When the first engaging teeth 22 are moved, the second engaging teeth 24 are moved in ganged relation to the first engaging teeth 22, radially outwardly into engagement ith the edge of the central circular hole 14 of the disc recording medium 16 that is mounted on the disc supporting surface 18 of the turntable 12, thereby pressing and holding the disc recording medium 16 on the disc supporting surface 18 of the turntable 12.

Figure 2B:
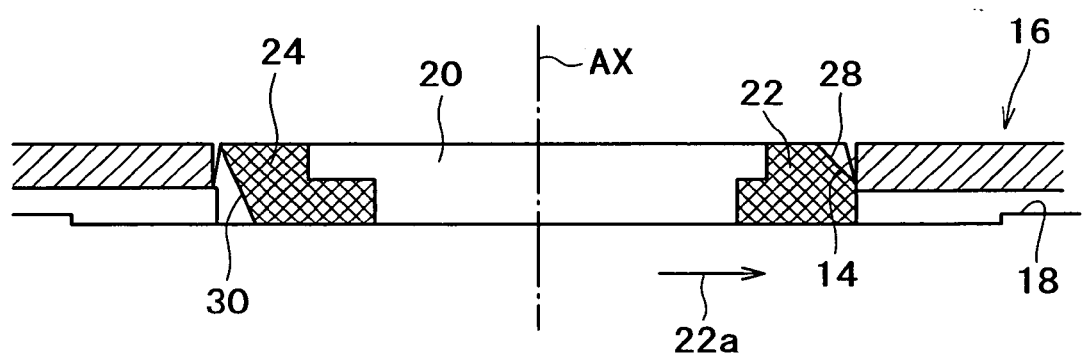
FIG. 2B is a cross-sectional view of the central block, the first engaging tooth, and the second engaging tooth shown in FIG. 1, together with the disc recording medium. The disc recording medium is shown in a state immediately prior to being seated on the turntable.
Figure 2C:
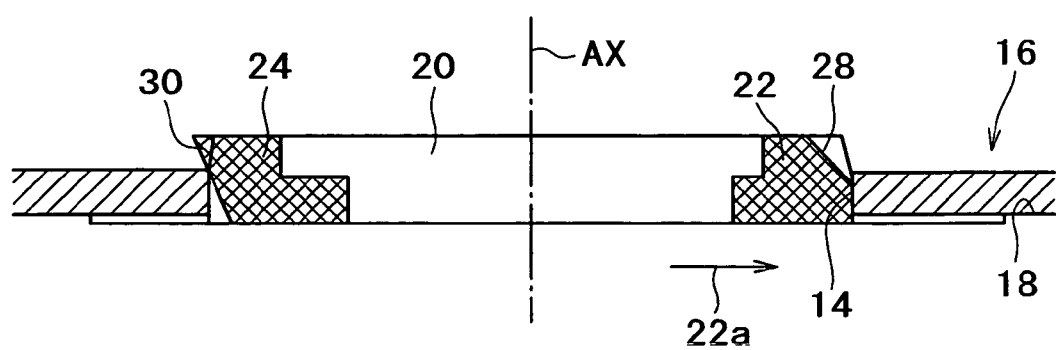
FIG. 2C is a cross-sectional view of the central block, the first engaging tooth, and the second engaging tooth shown in FIG. 1, together with the disc recording medium. The disc recording medium is shown in a state mounted on the turntable.

Operation of the first and second engaging teeth 22, 24 will be described below with reference to FIGS. 2A to 2C, each illustrating the central block 20, the first engaging teeth 22, the second engaging teeth 24, and the disc recording medium 16. FIG. 2A shows a state of the disc recording medium 16 prior to being mounted on the turntable 12, with the distal end of the first engaging member 22 projecting radially outwardly from the outer circumferential surface of the central block 20 and the distal end of the second engaging tooth 24 remaining radially inwardly of the outer circumferential surface of the central block 20. FIG. 2B shows a state of the disc recording medium 16 immediately prior to being seated on the turntable 12, with the first engaging member 22 pushed in the central block 20 and the distal ends of the first and second engaging teeth 22, 24 engaging the inner circumferential surface of the central circular hole 14 of the disc recording medium 16. FIG. 2C shows a state of the disc recording medium 16 that is mounted on the disc supporting surface 18 and held by the second engaging tooth 24, with the first engaging member 22 pushed in the central block 20 and the distal end of the second engaging tooth 24 projecting radially outwardly from the outer circumferential surface of the central block 20, the second engaging tooth 24 having an engaging surface 30 engaging the edge of the central circular hole 14 on the upper surface of the disc recording medium 16.

In FIGS. 2A to 2C, the first engaging tooth 22 is normally biased radially outwardly by a biasing mechanism to be described later on as indicated by the arrow 22a, and, as shown in FIG. 2A, is limited to a limit position against further radially outward movement by a stop mechanism to be described later on. When the first engaging tooth 22 is pushed radially inwardly against the bias of the biasing mechanism by a ganged biasing mechanism to be described later on, the second engaging tooth 24 is biased radially outwardly in ganged relation to the movement of the first engaging tooth 22.

As shown in FIGS. 1 and 2A to 2C, the first engaging tooth 22 has an engaging surface 28 facing obliquely upwardly on its distal end (radially outer end). The engaging surface 28 engages the edge of the central circular hole 14 of the disc recording medium 16 which is to be mounted on the disc supporting surface 18 of the turntable 12 by the user, generating forces to push the first engaging tooth 22 radially inwardly against the bias of the biasing mechanism. The second engaging tooth 24 has an engaging surface 30 facing obliquely downwardly on its distal end (radially outer end). The engaging surface 30 engages the edge of the central circular hole 14 of the disc recording medium 16 which is mounted on the disc supporting surface 18 of the turntable 12, generating forces to press the disc recording medium 16 against the disc supporting surface 18.

Figure 3:
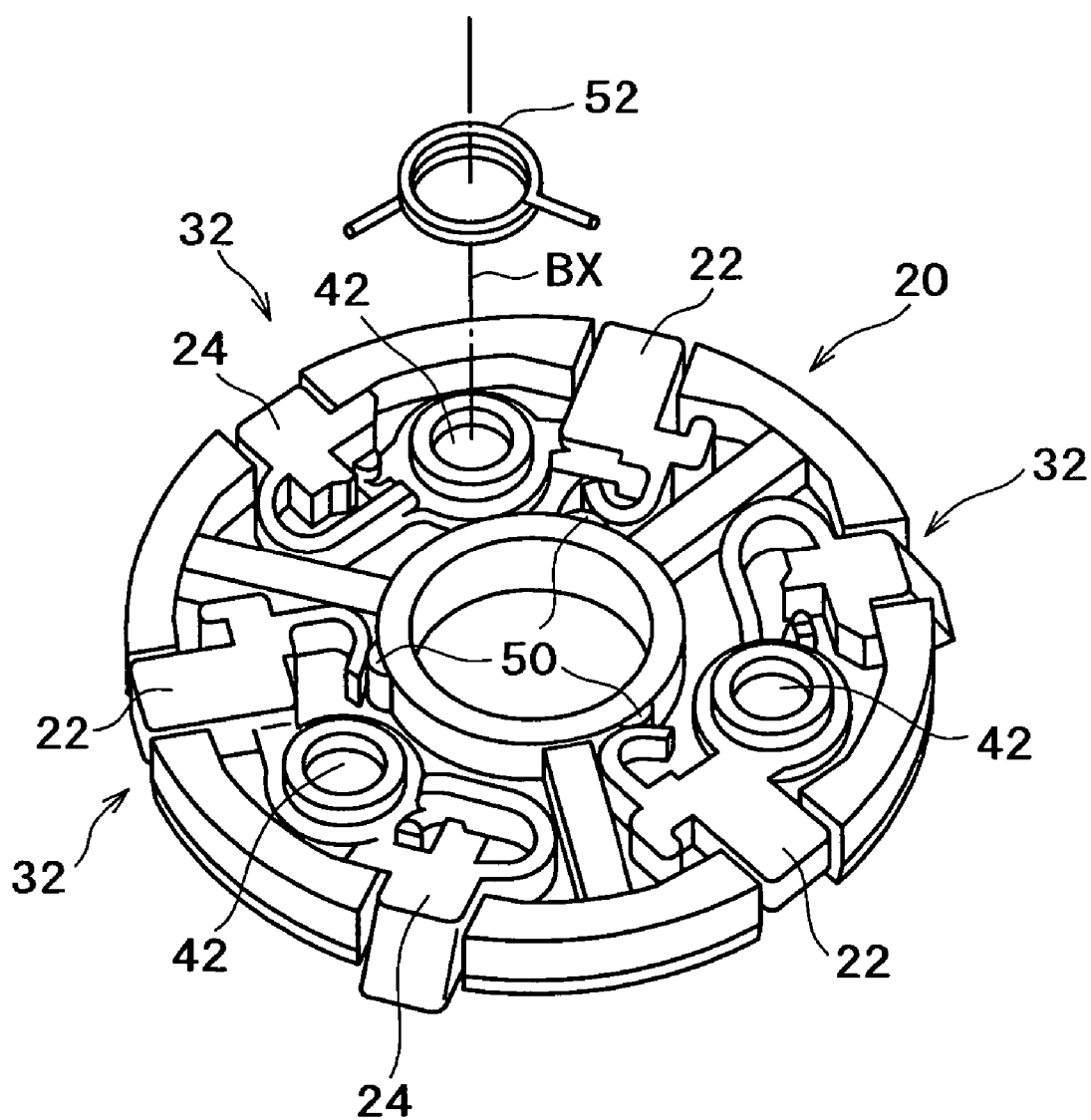
FIG. 3 is a perspective view of the reverse side of the central block shown in FIG. 1, illustrating internal components in the central block.

For mounting the disc recording medium 16 on the turntable 12, the user holds the disc recording medium 16 by hand, and presses the disc recording medium 16 against the turntable 12 so that the central block 20 of the turntable 12 fits in the central circular hole 14 of the disc recording medium 16. The edge of the central circular hole 14 at the lower surface of the disc recording medium 16 engages the engaging surfaces 28 of the first engaging teeth 22. Therefore, the user can push the first engaging teeth 22 radially inwardly against the bias of the biasing mechanism with the edge of the central circular hole 14 of the disc recording medium 16. The first engaging teeth 22 thus pushed radially inwardly are shown in FIG. 3. In FIG. 3, the second engaging teeth 24 are biased radially outwardly in ganged relation to the first engaging teeth 22 being pushed radially inwardly. However, since the distal ends of the second engaging teeth 24 abut against the inner circumferential surface of the central circular hole 14 of the disc recording medium 16, the second engaging teeth 24 do not project essentially from the outer circumferential surface of the central block 20.

As the user continuously presses the disc recording medium 16 downwardly until the disc recording medium 16 is mounted on the turntable 12, the distal ends of the second engaging teeth 24 are displaced upwardly from the central circular hole 14 of the disc recording medium 16. The engaging surfaces 30 of the second engaging teeth 24 are now brought into engagement with the edge of the central circular hole 14 at the upper surface of the disc recording medium 16, whereupon the second engaging teeth 24 hold the disc recording medium 16 on the disc supporting surface 18 of the turntable 12. The position of the parts at this time is illustrated in FIG. 2C. As can be seen from FIGS. 2A to 2C, the chuck mechanism according to the present invention is very thin, and is substantially as thick as the disc recording medium 16 and slightly thicker than the disc recording medium 16.

The biasing mechanism for biasing the first engaging tooth 22, the stop mechanism for limiting the first engaging tooth 22 to a limit position against further radially outward movement, and the ganged biasing mechanism for biasing the second engaging tooth 24 radially outwardly in ganged relation to the first engaging tooth 22 when the first engaging tooth 22 is pushed radially inwardly against the bias of the biasing mechanism will be described below. In the illustrated embodiment, these mechanisms are combined into a mechanism of simple structure employing a uniquely structured swing member. The mechanism is shown in FIGS. 3, 4, and 5A to 5C.

FIG. 3 shows in perspective the reverse side of the central block 20 shown in FIG. 1, illustrating internal components in the central block 20. The central block 20 in the form of a cap houses therein three swing members 32 that are swingably supported in the central block 20. The swing members 32 are disposed in positions which are equally spaced from the rotational axis AX (see FIG. 1) of the turntable 12 and disposed at substantially equal, angularly spaced intervals in the circumferential direction.

FIG. 4 shows in perspective one of the swing members 32, which are identically shaped, removed from the central block 20. The swing member 32 includes a central pivot support 34, the first engaging tooth 22 joined to the central pivot support 34 by a first arm 36, and the second engaging tooth 24 joined to the central pivot support 34 by a second arm 38. The central pivot support 34 has a hole 40 defined therein which is fitted over a pivot shaft 42 (see FIG. 3) integrally formed with the central block 20. The swing member 32 is thus supported on the pivot shaft 42 in the central pivot support 34 for swinging movement about a swing axis BX parallel to the rotational axis AX of the turntable 12. The first engaging tooth 22 and the second engaging tooth 24 are located in opposite positions spaced across the central pivot support 34 in the circumferential direction around the rotational axis AX of the turntable 12. The swing member 32 also has a spring engagement protrusion 42 on an edge of the central pivot support 34, a first stop protrusion 44 on a side of the first engaging tooth 22, a second stop protrusion 46 on a side of the second engaging tooth 24, and a spring protrusion 48 on a rear end of the first engaging tooth 22. The functions of these protrusions will be described later on. The swing member 32 includes a one-piece resin-molded member including the central pivot support 34, the first arm 36, the second arm 38, the first engaging tooth 22, the second engaging tooth 24, the spring engagement protrusion 42, the first stop protrusion 44, the second stop protrusion 46, and the spring protrusion 48 that are integrally formed with each other. The swing member 32 is made of a synthetic resin which is sufficiently strong and elastic.

The first arm 36 includes a sufficiently thick and substantially rigid arm, whereas the second arm 38 includes a slender, bent, flexible, and elastic arm. The first engaging teeth 22 and the second engaging teeth 24 are housed in respective slots defined in the central block 20 and extending radially therein. Particularly, the slots which house the second engaging teeth 24 function as guide slots for guiding the second engaging teeth 24 radially. The swing member 32 is shaped as a see-saw-type lever such that when the swing member 32 swings, one of the first and second engaging teeth 22, 24 is moved radially outwardly, and the other radially inwardly. Furthermore, since the second arm 38 is flexible, when the second arm 38 flexes, one of the first and second engaging teeth 22, 24 is not moved radially outwardly, and the other is moved radially. To allow only one of the first and second engaging teeth 22, 24 to move, at least one of the first and second arms 36, 38 may be flexible rather than the illustrated structure in which the first arm 36 is a rigid arm and the second arm 38 is a flexible arm. Therefore, the first engaging tooth 22 is movable substantially radially when the swing member 32 swings or the first arm 36 flexes, and the second engaging tooth 24 movable substantially radially when the swing member 32 swings or the second arm 38 flexes.

The spring protrusion 48 has a distal end portion kept in a flexed state at all times in abutment against a protrusion 50 (see FIG. 3) formed on the central block 20. The spring protrusion 48 serves to bias the first engaging tooth 22 radially outwardly at all times by biasing the swing member 32 in one swinging direction at all times. The first stop protrusion 44 serves to abut against an inner surface of the circumferential wall of the central block 20 to define a limit position of the first engaging tooth 22 against further radially outward movement under the bias of the spring protrusion 48. The second stop protrusion 46 also serves to abut against the inner surface of the circumferential wall of the central block 20 to define a limit position of the second engaging tooth 24 against further radially outward movement.

With the above arrangement, the swing member 32 keeps the first and second engaging teeth 22, 24 in ganged relation to each other for biasing the second engaging tooth 24 to move radially outwardly when the first engaging tooth 22 is pushed radially inwardly.

Each of the swing members 32 is combined with a helical torsion spring 52 which coacts with the swing member 32 (see FIG. 3, in which only one of the three helical torsion springs 52 is shown). The helical torsion spring 52 functions as a spring mechanism for setting the magnitude of a biasing force for biasing the second engaging tooth 24 to move radially outwardly when the first engaging tooth 22 is pushed radially inwardly. The magnitude of the biasing force can also be set to a desired value by determining the resilient force of the second arm 38 by appropriately designing the dimensions and shape of the second arm 38. Therefore, the helical torsion springs 52 may be dispensed with. However, the helical torsion springs 52 should preferably be included as they make it much easier to set the biasing forces of the second engaging teeth 24.

Each of the helical torsion springs 52 is fitted over a boss formed on the central pivot support 34 of the swing member 32. The helical torsion spring 52 has one arm engaging a radially inner end of the first engaging tooth 22 and the other arm engaging the spring engagement protrusion 42. The helical torsion spring 52 is preloaded and mounted on the swing member 32. The preloaded helical torsion spring 52 normally biases the first engaging tooth 22 and the spring engagement protrusion 42 radially outwardly. When the first engaging tooth 22 is pushed radially inwardly to cause the swing member 32 to swing, the other arm of the helical torsion spring 52 moves out of engagement with the spring engagement protrusion 42 and into engagement with a radially inner end of the second engaging tooth 24, biasing the second engaging tooth 24 radially outwardly.

Figure 5A:
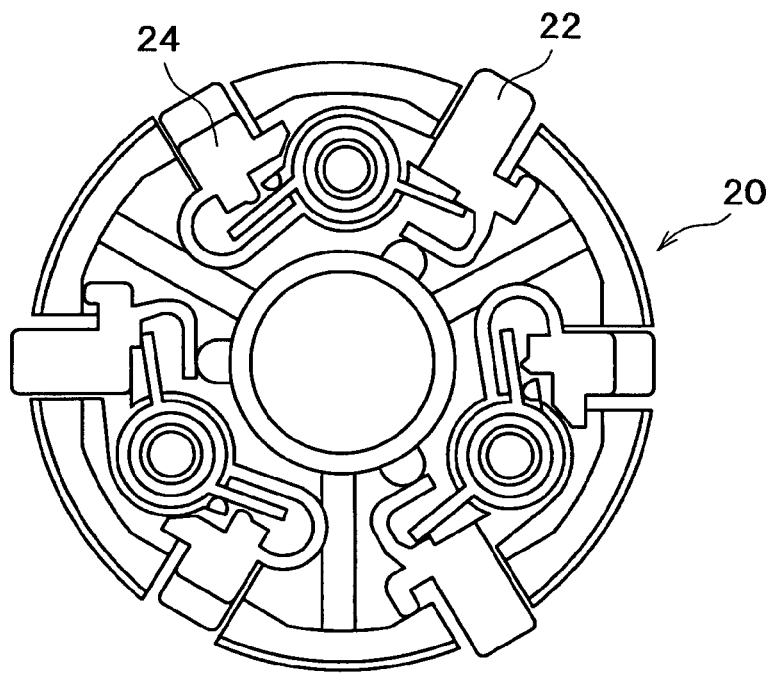
FIG. 5A is a view showing the swing members disposed in the central block which are in a state corresponding to the state shown in FIG. 2A.
Figure 5B:
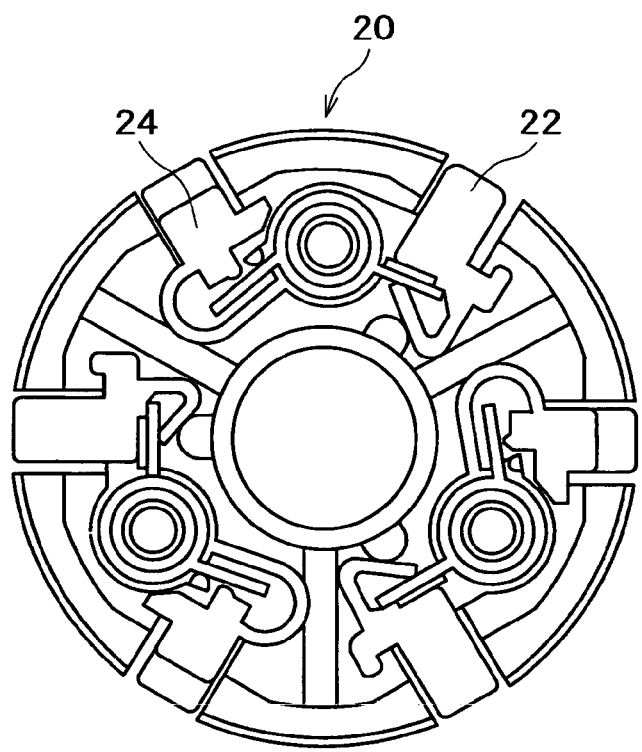
FIG. 5B is a view showing the swing members disposed in the central block which are in a state corresponding to the state shown in FIG. 2B.
Figure 5C:
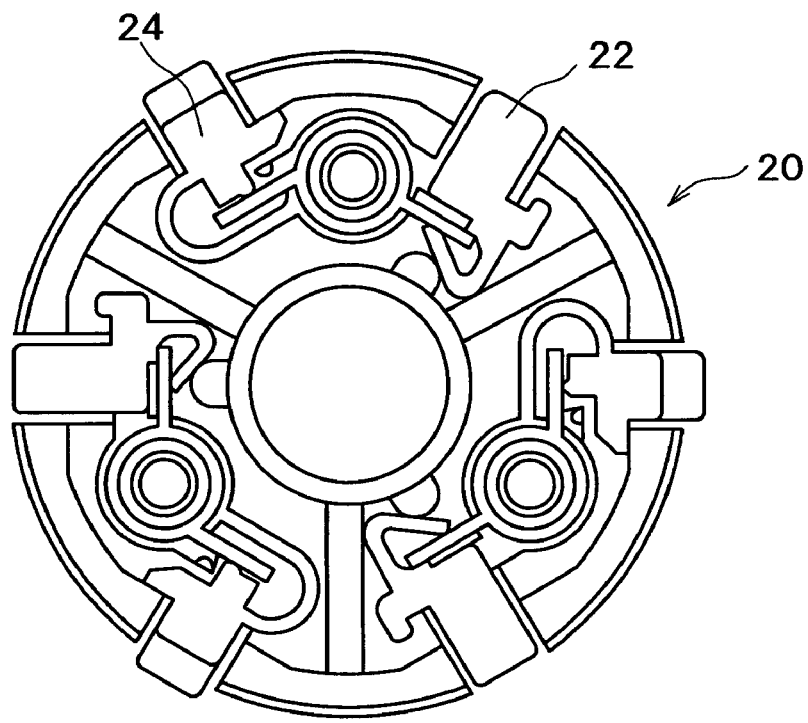
FIG. 5C is a view showing the swing members disposed in the central block which are in a state corresponding to the state shown in FIG. 2C.
Figure 6:
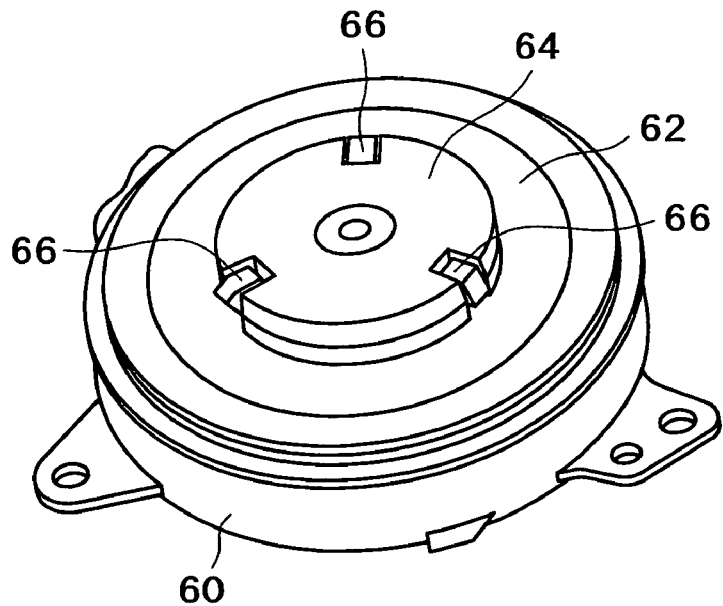
FIG. 6 is a perspective view of a conventional chucking mechanism.
Figure 7:
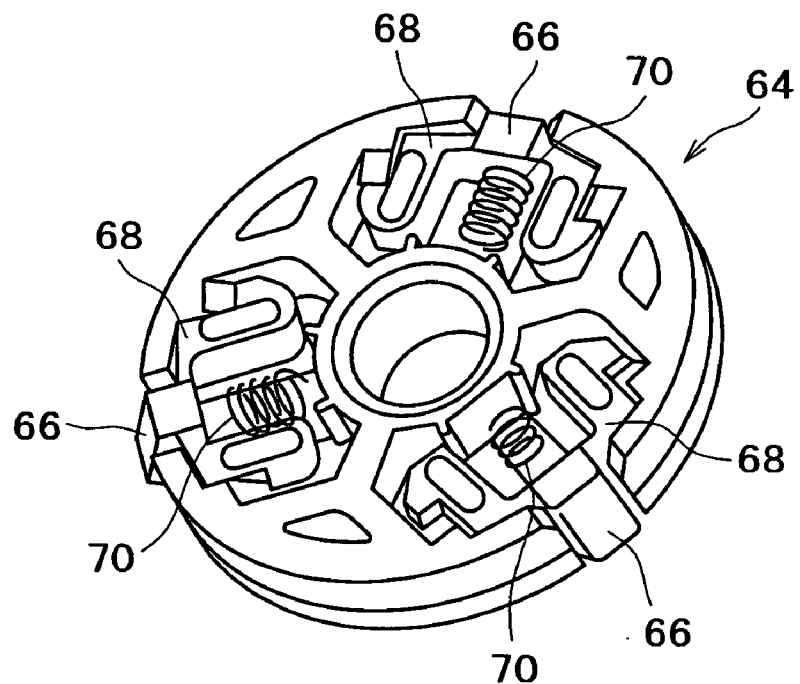
FIG. 7 is a perspective view of the reverse side of a central block shown in FIG. 6, illustrating internal components in the central block.
Figure 8:
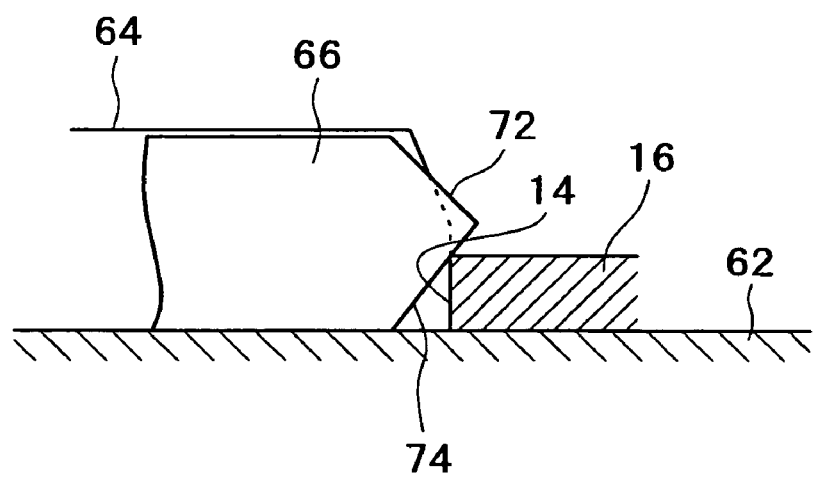
FIG. 8 is a fragmentary cross-sectional view of the central block and an engaging tooth shown in FIG. 6, together with a disc recording medium.

FIGS. 5A to 5C show states of the swing members 32 which correspond respectively to the states shown in FIGS. 2A to 2C. FIG. 5A shows the state of the swing members 32 before the disc recording medium 16 is mounted on the turntable 12. In the state shown in FIG. 5A, the distal ends of the first engaging teeth 22 project radially outwardly from the outer circumferential surface of the central block 20, and the distal ends of the second engaging teeth 24 remain positioned radially inwardly of the outer circumferential surface of the central block 20. FIG. 5B shows the state of the swing members 32 immediately before the disc recording medium 16 is seated on the disc supporting surface 18 of the turntable 12. In the state shown in FIG. 5B, the first engaging teeth 22 are pushed in the central block 20, and the distal ends of the first and second engaging teeth 22, 24 engage the inner circumferential surface of the central circular hole 14 of the disc recording medium 16 (see FIG. 2B). FIG. 5C shows the state of the swing members 32 when the disc recording medium 16 is mounted on the turntable 12 and held thereon by the second engaging teeth 24. In the state shown in FIG. 5C, the first engaging teeth 22 are pushed in the central block 20, and the distal ends of the second engaging teeth 24 project radially outwardly from the outer circumferential surface of the central block 20, with the engaging surfaces 30 of the second engaging teeth 24 engaging the edge of the central circular hole 14 on the upper surface of the disc recording medium 16 (see FIG. 2C).

As shown in FIGS. 2C and 5C, when the second engaging teeth 24 hold the disc recording medium 16, the other arms of the helical torsion springs 52 engage the second engaging teeth 24, not the spring engaging protrusions 42. Therefore, the forces with which the second engaging teeth 24 hold the disc recording medium 16 are produced by the resilient forces of the helical torsion springs 52 and the resilient forces of the second arms 38 of the swing members 32. In the illustrated embodiment, particularly, the former resilient forces are made greater than the latter resilient forces to determine the forces with which the second engaging teeth 24 hold the disc recording medium 16, principally based on the resilient forces of the helical torsion springs 52.

Although a certain preferred embodiment of the present invention has been shown and described in detail, it should be understood that various changes and modifications may be made therein without departing from the scope of the appended claims.

What is claimed is:

1. A chucking mechanism for holding a disc recording medium having a central circular hole on a disc supporting surface of a turntable, comprising:

a central block disposed centrally on said turntable concentrically with a rotational axis of said turntable for fitting in the central circular hole of said disc recording medium; and a plurality of swing members swingably supported on said central block and disposed in positions equally spaced from the rotational axis of said turntable at angularly spaced intervals in a circumferential direction of the turntable;

each of said plurality of swing members comprising a central pivot support, a first engaging tooth joined to said central pivot support by a first arm, and a second engaging tooth joined to said central pivot support by a second arm, each of said plurality of swing members being supported at said central pivot support for swinging movement about a swing axis parallel to the rotational axis of said turntable, said first and second engaging teeth being located in opposite positions spaced across said central pivot support in the circumferential direction around the rotational axis of said turntable;

at least one of said first and second arms of said swing members being flexible to allow said first engaging tooth to move substantially radially of the rotational axis of said turntable when said swing member swings or said first arm flexes, and to allow said second engaging tooth to move substantially radially of the rotational axis of said turntable when said swing member swings or said second arm flexes;

each of said swing members further comprising a biasing mechanism for biasing said first engaging tooth radially outwardly of the rotational axis of said turntable by biasing said swing member in one swinging direction, so that said biasing mechanism keeps said first and second engaging teeth in ganged relation and biases said second engaging tooth radially outwardly of the rotational axis of said turntable when said first engaging tooth is pushed radially inwardly of the rotational axis of said turntable;

said first engaging tooth having a radially outer end capable of projecting radially outwardly from an outer circumferential surface of said central block and engageable with an edge of the central circular hole of said disc recording medium, said first engaging tooth having on the radially outer end an engaging surface for engaging the edge of the central circular hole of said disc recording medium when said disc recording medium is mounted on said disc supporting surface, for thereby producing forces to push said first engaging teeth radially inwardly;

said second engaging tooth having a radially outer end capable of projecting radially outwardly from the outer circumferential surface of said central block and engageable with an edge of the central circular hole of said disc recording medium, said second engaging tooth having on the radially outer end an engaging surface for engaging the edge of the central circular hole of said disc recording medium that has been mounted on said disc supporting surface, thereby producing forces to press and hold said disc recording medium against said disc supporting surface of said turntable;

wherein, when said disc recording medium is being mounted on said disc supporting surface, said first engaging tooth is pushed radially inwardly of the rotational axis of said turntable by the edge of the central circular hole of said disc recording medium, and when said disc recording medium has been mounted on said disc supporting surface, said second engaging tooth holds said disc recording medium on said disc supporting surface of said turntable.

2. The chucking mechanism according to claim 1, wherein each of said plurality of swing members comprises a one-piece resin-molded member including said central pivot support, said first arm, said second arm, said first engaging tooth, and said second engaging tooth, which are integrally formed with each other.

3. The chucking mechanism according to claim 1, wherein each of said plurality of swing members further comprises a spring mechanism for setting a magnitude of a biasing force for biasing said second engaging tooth radially outwardly of the rotational axis of said turntable when said first engaging tooth is pushed radially inwardly of the rotational axis of said turntable.

4. The chucking mechanism according to claim 3, wherein each said spring mechanism includes a helical torsion spring held to cooperate with said plurality of swing members.

* * * * *